United States Patent
Schauder

(10) Patent No.: US 7,554,302 B2
(45) Date of Patent: Jun. 30, 2009

(54) SLIP-CONTROLLED, WOUND-ROTOR INDUCTION MACHINE FOR WIND TURBINE AND OTHER APPLICATIONS

(75) Inventor: Colin David Schauder, Murrysville, PA (US)

(73) Assignee: SATCON Technology Corporation, Boston, MA (US)

( * ) Notice: Subject to any disclaimer, the term of this patent is extended or adjusted under 35 U.S.C. 154(b) by 330 days.

(21) Appl. No.: 11/521,426

(22) Filed: Sep. 14, 2006

(65) Prior Publication Data

US 2007/0063677 A1 Mar. 22, 2007

Related U.S. Application Data

(60) Provisional application No. 60/718,088, filed on Sep. 16, 2005.

(51) Int. Cl.
*H02P 9/00* (2006.01)
*H02P 9/10* (2006.01)

(52) U.S. Cl. .................................... 322/44; 322/59

(58) Field of Classification Search ................ 322/29, 322/44, 59, 43; 323/207, 209; 363/137, 363/102

See application file for complete search history.

(56) References Cited

U.S. PATENT DOCUMENTS

| | | | | |
|---|---|---|---|---|
| 3,775,649 A | * | 11/1973 | Bayer et al. | 318/702 |
| 4,695,776 A | * | 9/1987 | Dishner et al. | 318/14 |
| 4,982,147 A | * | 1/1991 | Lauw | 318/729 |
| 5,385,042 A | | 1/1995 | La Belle | 73/117 |
| 5,493,201 A | * | 2/1996 | Baker | 322/10 |
| 5,568,023 A | * | 10/1996 | Grayer et al. | 318/139 |
| 5,754,420 A | | 5/1998 | Luce | 363/102 |
| 5,798,631 A | * | 8/1998 | Spee et al. | 322/25 |
| 2005/0077800 A1 | * | 4/2005 | Hoeijmakers | 310/266 |
| 2005/0200336 A1 | * | 9/2005 | Drubel et al. | 322/59 |
| 2006/0028025 A1 | * | 2/2006 | Kikuchi et al. | 290/44 |
| 2006/0192390 A1 | * | 8/2006 | Juanarena Saragueta et al. | 290/44 |
| 2007/0278797 A1 | * | 12/2007 | Flannery et al. | 290/44 |

FOREIGN PATENT DOCUMENTS

| | | | |
|---|---|---|---|
| SU | 872333 | * | 10/1981 |
| SU | 911020 | * | 4/1982 |

* cited by examiner

*Primary Examiner*—Julio C. Gonzalez R.
(74) *Attorney, Agent, or Firm*—Weingarten, Schurgin, Gagnebin & Lebovici LLP

(57) ABSTRACT

A system and method for providing constant-frequency electrical power from variable-speed mechanical power are disclosed. The system includes a wound-rotor induction machine generator (WRIMG), a first power converter, e.g., an inverter or a bridge rectifier, that provides power from the stator assembly of the WRIMG to the load, and a second power converter, e.g., an inverter or a bridge rectifier, that provides power from the rotor assembly of the WRIMG to the load. A controller controls the output stator-current based on comparisons between measured DC load bus data and a reference DC load bus voltage value, measured machine shaft angular position and reference rotor frequency data, and measured stator-current data that is fed-back to the stator-current controller by the power converter device(s).

12 Claims, 7 Drawing Sheets

SLIP-CONTROLLED, WOUND-ROTOR INDUCTION MACHINE FOR WIND TURBINE AND OTHER APPLICATIONS

CROSS REFERENCE TO RELATED APPLICATIONS

This application claims the benefit of U.S. provisional patent application No. 60/718,088 filed on Sep. 16, 2005, which is incorporated herein in its entirety by reference.

STATEMENT REGARDING FEDERALLY SPONSORED RESEARCH OR DEVELOPMENT

N/A

BACKGROUND OF THE INVENTION

The present invention relates, in general, to a system and method for inductively converting variable-speed mechanical power into constant-frequency electrical power and, more specifically, to a system and method for controlling the load bus voltage of a variable-speed, wound-rotor induction machine to provide electrical power at a constant-frequency.

There has been an increasing interest in non-fossil fuel energy sources as a consequence of the escalating cost and political ramifications associated with a reliance on foreign oil. Wind turbine generators ("WTGs") are one of many current sources that provide an environmentally-friendly, non-polluting energy source. WTGs are variable-speed current sources that convert mechanical energy into electrical power. More particularly, in WTGS, mechanical power, resulting from the wind-driven rotation of generator turbine blades, is converted into current. Conventionally, the turbine blades are mechanically-coupled to a rotor assembly of an induction-type motor generator. As the blades rotate, so does the rotor assembly.

Corresponding electrical windings are provided on the shaft of the rotor assembly and on a stator assembly. Rotation of the rotor shaft within the rotor assembly causes rotation of the rotor assembly windings and induces current flow in the stator assembly windings. The induced current can be converted and phased as necessary. The voltage also can be stepped-up (or stepped-down), e.g., using a transformer, to produce electrical power at a desired voltage.

Because the rate of rotation of the WTGs depends on the force of the wind, the blades and rotor shaft rotate at a variable speed due to the changing wind force and wind velocity. Variable rotational speeds can be problematic, however, because, when delivering electrical power to a load, especially when delivering power to an alternating current ("AC") utility grid, current at a constant-frequency, such as 50 or 60 Hertz (Hz), is desired.

Conventionally, some power generators or power generating systems deliver electrical power to a load from the stator of the wound-rotor induction machine generator (WRIMG), using an electrical "cascade" arrangement to provide an excitation current to the windings of the rotor of the WRIMG through slip-rings. Historically, a "cascade" arrangement refers to a rotating drive arrangement in which the rotor assembly of a WRIMG is fed from the stator assembly of an auxiliary induction machine that is mounted on the same rotor shaft. More particularly, the rotating shaft of a wind turbine is mechanically coupled to the rotor assembly of a WRIMG thereby providing mechanical input power to the WRIMG. The electrical cascade that supplies the rotor windings is essentially a controlled variable-frequency power source.

Referring to FIG. 1, mechanical power from the wind turbine shaft (not shown) is transferred to the rotor assembly 16 of the WRIMG 15. The transferred mechanical power drives the rotor assembly 16, causing it to rotate. The rotor windings 13 disposed on the rotor assembly 16 induce current in the corresponding stator windings 19, which are disposed on the stator assembly 17. The induced current in the stator windings 19 is then delivered by a stator bus 21 to a load such as an AC utility power grid 18.

For the conventional system 10 shown in FIG. 1, the AC utility power grid 18 is directly coupled to the stator windings 19 of the WRIMG 15. Therefore, AC grid voltage of the AC utility power grid 18 determines (by virtue of its magnitude and frequency) the actual level of excitation of the machine 10 for each phase and the synchronous speed of the machine 10.

Such machines 10 are controlled, generally, by controlling the rotor current in a continuously rotating reference frame that is determined by the instantaneous stator voltages. A controlled current is delivered to the rotor windings 13 from the electrical cascade at slip frequency, i.e. the difference between the electrical frequency $\omega$ of the stator assembly 14 and the (electrical) rotation frequency $\omega_r$, or speed, of the rotor assembly 16. Electrical rotation frequency is the rotational speed of the rotor assembly 16 (radians/second) multiplied by the number of pole-pairs in the machine 10.

The rotor current, in turn, largely determines the stator current and, hence, the power delivered from the stator assembly 17 to the AC utility power grid 18. Therefore both the instantaneous phase of the rotor current in the rotating reference frame, as well as its magnitude, must be regulated in order to deliver a desired power to the AC utility power grid 18 with a desired power factor.

The rotor terminal power, or "slip power", is approximately proportional to the per-unit slip frequency, i.e., $((\omega - \omega_r)/\omega)$, multiplied by the stator terminal power. Therefore the power rating of inverters 12 and 14 is generally a fraction of the total power delivered to the AC utility power grid 18.

In the conventional system 10 shown in FIG. 1, the rotor assembly 16 is electrically-coupled to a cascaded rotor inverter 12 and grid inverter 14 via a rotor bus 22. Electrical power is transferred between the rotor assembly 16 and the AC utility power grid 18 via the cascaded inverters 12 and 14. Conventionally, the rotor inverter 12 is capable of delivering current to the rotor assembly 16 at the maximum rated current over a range of slip frequencies, including zero frequency.

The slip frequency, which is also the electrical frequency appearing at the rotor terminals or "slip rings", will assume values within a limited range depending on the rotor speed range and the associated stator frequencies imposed by a controller.

At any point in time, the variable speed of the rotor assembly 16 can be at, above or below synchronous speed. During super-synchronous operation, corresponding to negative slip conditions, stator power and rotor power flow out of the machine 10 to the load via the stator bus 21 and the rotor bus 22, respectively. In contrast, during sub-synchronous operation, corresponding to positive slip conditions, stator power flows out of the machine 10 via the stator bus 21. However, instead of rotor power flowing out of the machine 10, power from the AC utility power grid 18 flows into the rotor assembly 16 via the rotor bus 22.

As a result, some portion of the stator power is returned to the machine 10 through the rotor assembly 16. Disadvantageously, some prior art systems restrict machine 10 operation either to a super-synchronous mode of operation or to a sub-synchronous mode of operation. Thus, in these instances, the topologies for the grid inverters 14 and rotor inverters 12 are structured and arranged to provide uni-directional power flow only.

So, for example, if the machine 10 topology were structured for sub-synchronous operation, when operating speed of the machine 10 is super-synchronous, rotor assembly 16 power is prevented from flowing out of the machine 10. If, on the other hand, the machine 10 topology were structured for super-synchronous operation, when operating speed of the machine 10 is sub-synchronous, there would be no way for power from the AC utility power grid 18 to flow into the rotor assembly 16.

FIG. 2 provides an alternative conventional topology that does not require use of an electrical cascade for rotor excitation. This full power, double-conversion system 20, typically, does not include external connections to the rotor assembly 16, which may have internally short-circuited windings or be of the "cage"-type of construction. Hence, all of the electrical power output comes from the stator assembly 17.

As shown in FIG. 2, the stator windings 19 disposed on the stator assembly 17 are electrically-coupled to the AC utility power grid 18 through a full-power-rated, bi-directional power converter 25. The power converter 25 includes an AC-to-DC stator inverter 11 and a DC-to-AC grid inverter 14, and is capable of transferring power between the stator windings 19 and the AC utility power grid 18 even if the frequency of the stator terminal voltages differs from the frequency of the voltage on the AC utility power grid 18.

Such machines 20, generally, are controlled using "field-oriented control" techniques. Field-oriented control, or "vector power control", controls torque and current by interacting, i.e., crossing, an impressed stator current vector with a rotor flux vector that is generated by the inductance of the rotor assembly 16 and the stator assembly 17. As a result, field-oriented control applies a variable, rotating frame of reference, i.e., the rotor flux vector, to decouple the flux-producing stator current from the torque-producing stator current.

Thus, vector power control provides the proper and most efficient alignment or angular relationship, i.e., orthogonal or a 90-degree orientation, of a desired, flux-producing portion of stator current that is in a perpetually rotating flux field and a desired, torque-producing portion of stator current. More specifically, a desired rotor flux angle, which is defined by the angle of the flux field coordinate system with respect to a stationary frame of reference, is periodically determined and used to adjust the stator current.

The full-power, double-conversion system 25 provides an interface between the AC utility power grid 18 and the WRIMG 15. Consequently, the excitation of the WRIMG 15 is not directly influenced by the voltage of the utility power grid 18. However, a major disadvantage of full-power, double-conversion schemes and field-oriented control is the relatively high cost of full-power-rated power converters. Accordingly, it would be desirable for an alternative system that provides an interface between the AC utility power grid 18 and the WRIMG 15; that does not use field-oriented control or full-power-rated power converters; that requires lower total inverter power; and that regulates slip to maximize output power capability over a selected frequency range.

SUMMARY OF THE INVENTION

A system and method for providing electrical power to an AC or a DC load from an induction machine generator driven by a variable-speed mechanical power source is disclosed. The system includes a wound-rotor induction machine that is mechanically-rotated by a rotor shaft disposed in a rotor assembly driven by a mechanical power source. The input of a first power converter is electrically-coupled to the stator windings. The output of the first power converter is electrically-coupled to a DC load bus. The input of a second power converter is electrically-coupled to the rotor windings. The output of the second power converter is also electrically-coupled to a DC load bus, which can be the same load bus as that coupled to the output of the first power converter.

BRIEF DESCRIPTION OF THE DRAWINGS

The invention will be better understood by reference to the following detailed description in conjunction with the drawings of which.

DETAILED DESCRIPTION OF THE INVENTION

A system and method for converting mechanical power from a variable-speed, mechanical-energy source into direct current ("DC") electrical power (current) delivered to a DC load bus with a regulated DC voltage is disclosed. More specifically, a slip-controlled, wound rotor induction machine generator 30 ("WRIMG") is disclosed.

Figure 3:
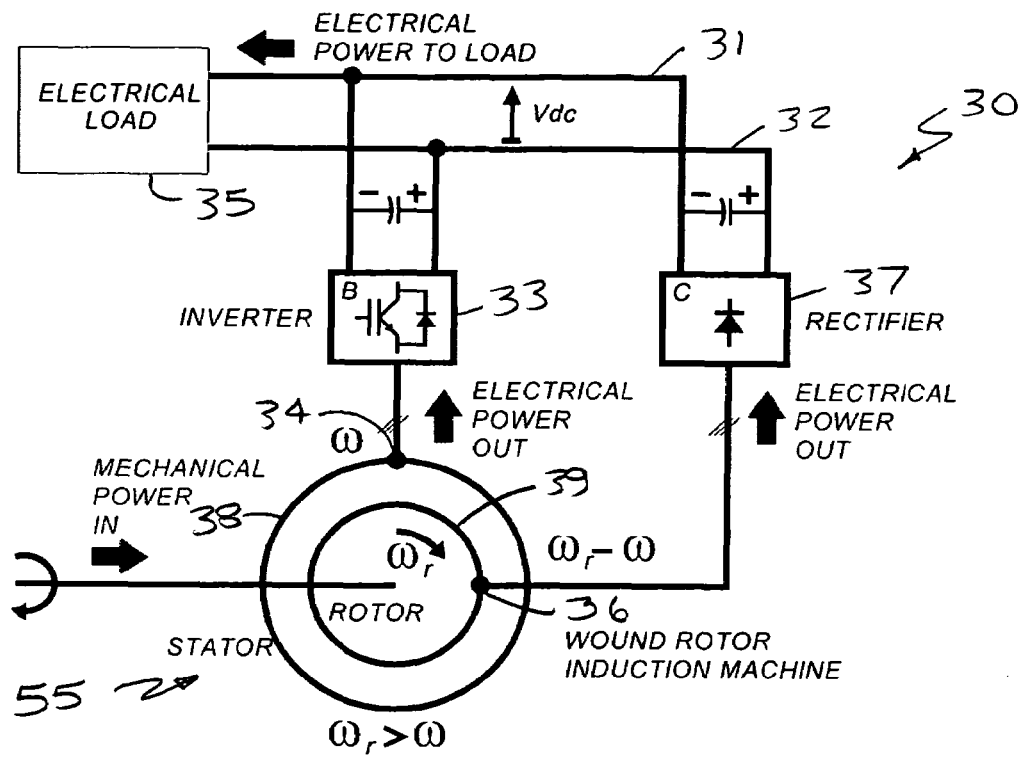
FIG. 3 is a diagram depicting a slip-controlled, wound-rotor induction machine generator in accordance with the present invention.

Referring to FIG. 3, the disclosed WRIMG 30 operates as a generator converting mechanical input power into electrical output power. More particularly, the WRIMG 30 delivers DC, i.e., zero frequency, power (current) to a pair of DC load bus lines 31 and 32 having a regulated, constant or substantially constant DC voltage ($V_{DC}$). The DC load bus lines 31 and 32 are coupled to an electrical load 35 that is capable of absorbing power from a constant voltage DC source. The electrical load 35 can use the DC power directly, e.g., for heating, or can further convert it for various purposes, e.g., for transferring power to an AC electrical power grid.

The WRIMG 30 includes a wound-rotor induction machine ("WRIM") having a stator assembly 38 and a rotor assembly 39. The rotor assembly 39 rotates and can be driven by any mechanically-coupled power source including a wind-turbine, a gas-powered turbine, a hydro-powered turbine, a flywheel energy storage system or any other machine and/or power system that produces mechanical rotation at a variable-speed (not shown). Each of the rotor assembly 39 and stator assembly 38 includes corresponding windings 36 and 34, respectively. The conventional operation of a WRIM is well-known to the art and, accordingly, will not be described in greater detail.

The input of a first power converter 33, such as an AC-DC inverter, is electrically-coupled to the stator windings 34 of the stator assembly 38 and the output of a first power converter 33 is electrically-coupled to the pair of DC load bus lines 31 and 32. The first power converter 33 includes sensors that provide signals to a controller for determining (or calculating) an instantaneous excitation frequency, $\omega$, of the stator assembly 38.

The input of a second power converter 37, such as rectifier bridge, is electrically-coupled to the polyphase rotor terminals, i.e., the "slip-rings" 36, of the rotor assembly 39. The output of the second power converter 37 is electrically-coupled to the pair of DC load bus lines 31 and 32. The rectifier bridge used as a second power converter 37 can be a simple, low-cost, full-wave diode rectifier or an active rectifier. As shown in FIG. 3, the outputs of the first and second power converters 33 and 37 can be electrically-coupled to the same pair of DC load bus lines 31 and 32.

At the rotor terminals 36, the excitation frequency induced by the slip-rings 36 is given by the equation:

$$\omega_r - \omega,$$

where $\omega_r$ is the (electrical) rotation frequency or speed of the rotor assembly 39 and $\omega$ is the electrical frequency produced by the stator assembly 38. When the second power converter 37 conducts current, the line-line terminal voltages of the rotor assembly 39 are limited to $V_{DC}$ in amplitude. Therefore, the phase voltages of the rotor assembly 39 approximate a set of quasi-square waves of amplitude $V_{DC}/2$. Thus, rotor phase voltage, which is proportional to $V_{DC}$, and rotor frequency, which is determined by the choice of the electrical frequency produced by the stator assembly $\omega$, determine the level of the magnetic flux in the WRIM.

For example, the ratio of rotor terminal power to stator terminal power is approximately equal to the frequency ratio:

$$(\omega_r - \omega)/\omega.$$

Neglecting the magnetizing current, the ratio of rotor current to stator current is approximately equal to the ratio of the number of stator winding turns to the number of rotor windings turns, which is a constant for a particular machine.

By regulating the magnitude and frequency of the stator current, the electromagnetic torque in the WRIMG 30 and power throughput can be controlled. Moreover, by this regulation, and through coordination with pitch and throttle controls of the mechanical power source, the controller can control the speed of the WRIMG 30 for optimal performance. Thus, the controller can control the power output from the WRIMG 30 at a desired frequency without using "field-oriented control".

Figure 4A:
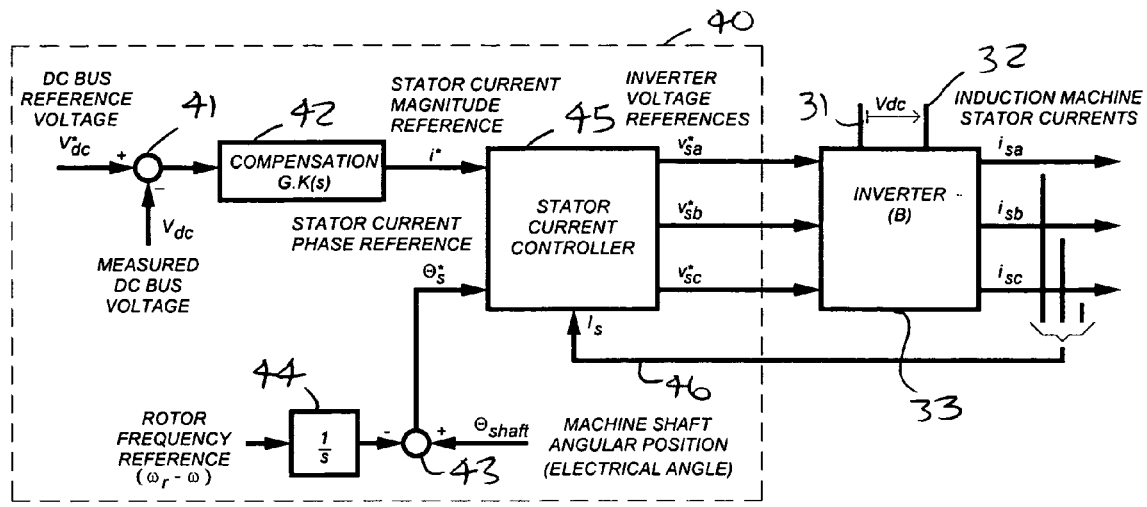
FIGS. 4A and 4B are block diagrams depicting alternate control schemes for the slip-controlled, wound-rotor induction machine generator in accordance with the present invention.
Figure 4B:
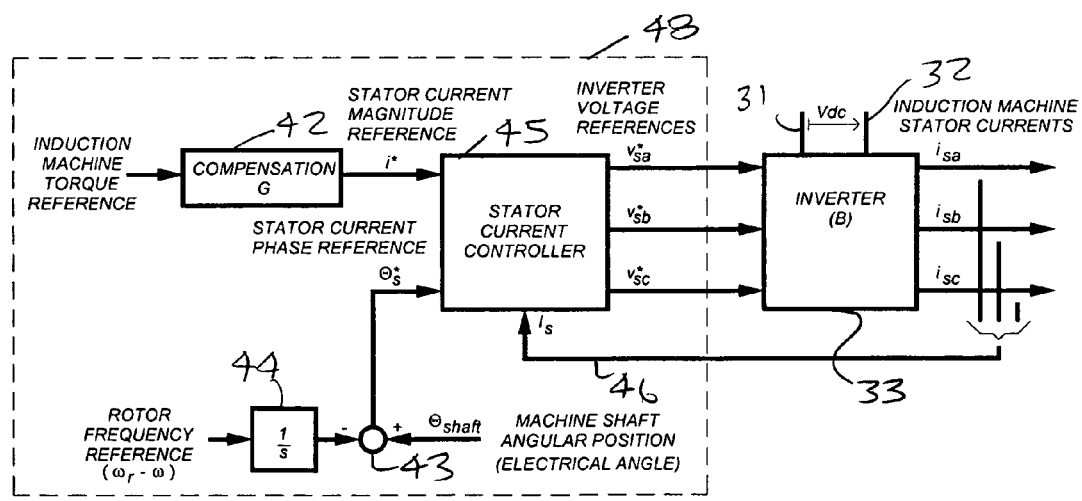

FIGS. 4A and 4B show alternative control mechanisms for controlling the WRIMG 30 and the stator current therefrom. A controller 40 in operational association with the WRIMG 30 is structured and arranged to control the magnitude and the frequency and the integrated phase angle of the stator current. The controller 40 maintains the rotor frequency, $\omega_r - \omega$, at a constant or substantially constant, positive value. When the rotor frequency is a constant or substantially constant positive value, the WRIMG 30 operates at a favorable slip, which maximizes the total output power provided by WRIMG 30. More specifically, the controller 40 controls the magnitude and frequency of the stator current by producing a positive sequence set with a frequency (phase), $\omega$, and a magnitude, $I_s$.

Referring to FIG. 4A, there is shown a first stator-current controller 40 that regulates the DC load bus voltage so that, for any given mechanical speed, the torque produced by the WRIMG 30 is determined and controlled by the required DC electrical load 35.

The controller 40 includes a plurality of sensors (not shown), at least two comparators 41 and 43, and a stator-current controller 45. The sensors measure and forward data, such as the measured DC bus voltage ($V_{DC}$), the stator current for each phase ($i_{sa}$, $i_{sb}$, and $i_{sc}$), and the angular position of the machine shaft ($\Theta_{shaft}$), to the comparators 41 and 43. The comparators 41 and 43 compare these data with reference values. The results of the comparisons are provided to the stator-current controller 45, which, based on the results of the comparisons, provides signals to the first power converter 33 to control stator current.

More particularly, sensors provide instantaneous measurements of the DC bus voltage, $V_{DC}$, to the first comparator 41 and other sensors provide instantaneous measurements of angular position of the rotary shaft, $\Theta_{shaft}$, to a second comparator 43. The measured DC bus voltage, $V_{DC}$, is compared to a reference voltage, $V^*$. The reference voltage corresponds to the DC bus voltage, $V^*_{DC}$, of the DC electrical load 35.

The first comparator 41 calculates a difference between the two voltages, i.e., $V^*_{DC} - V_{DC}$. The difference between the two voltages, i.e., $V^*_{DC} - V_{DC}$, is then applied to a compensator 42 that generates a stator current magnitude reference value, $I^*$. The stator current magnitude reference value, $I^*$, becomes a first input into the stator-current controller 45.

At the second comparator 43, the measured angular position of the rotary shaft, $\Theta_{shaft}$, is compared to a reference rotor assembly frequency value, $\omega_r - \omega$, that has been integrated by an integrator 44. The second comparator 43 calculates a stator current phase reference value, $\Theta^*_s$, which corresponds to the difference between the measured angular position of the rotary shaft, $\Theta_{shaft}$, and the reference rotor assembly frequency value, $\omega_r - \omega$. The stator current phase reference, $\Theta^*_s$, becomes the second input into the stator-current controller 45.

Sensors disposed on the stator-current bus line 31 and 32 also provide instantaneous stator current, $I_s$, measurements to the stator-current controller 45. More specifically, sensors measure output stator-current for each phase, $i_{sa}$, $i_{sb}$, and $i_{sc}$, commensurate with the stator-voltage references for each phase, $v^*_{sa}$, $v^*_{sb}$, and $v^*_{sc}$. The output stator-current measurements for each phase are fed-back to the stator-current controller 45 as an instantaneous stator current, $I_s$.

The input stator current magnitude reference value, $I^*$, the input stator current phase reference value, $\Theta^*_s$, and the instantaneous stator current, $I_s$, are then applied to the stator-current controller 45, which outputs signals to the first power converter 33 to generate stator-voltage references for each phase, $v^*_{sa}$, $v^*_{sb}$, and $v^*_{sc}$.

The stator-voltage references for each phase, $v^*_{sa}$, $v^*_{sb}$, and $v^*_{sc}$, are applied to the DC load bus lines 31 and 32. As mentioned above, output stator-current measurements for each phase, $i_{sa}$, $i_{sb}$, and $i_{sc}$, commensurate with the stator-voltage references for each phase, $v^*_{sa}$, $v^*_{sb}$, and $v^*_{sc}$, are made by sensors and the measurements are fed-back to the stator-current controller 45 as an instantaneous stator current, $I_s$. Accordingly, control of the stator current and DC bus voltage is a function of the phase angle, $\Theta_s$, and stator current magnitude, $I_s$, only. More complex, field-oriented control is not required or desired.

FIG. 4B shows an alternative controller 48 for regulating the DC load bus voltage independently of the WRIMG 30 and its controls. The alternative controller 48 differs from the first-described controller 40 in that the measured DC load bus voltage, $V_{DC}$, is not compared to the desired or reference DC load bus voltage, $V^*_{DC}$. Rather, a reference torque from the WRIMG 30 is used to provide a stator-current magnitude reference, I*, for input into the stator-current controller 45. Accordingly, control of the WRIMG 30 is not based on the DC voltage of the utility grid. Moreover, the DC load bus voltage can be regulated separately from the WRIMG 30.

Figure 5:
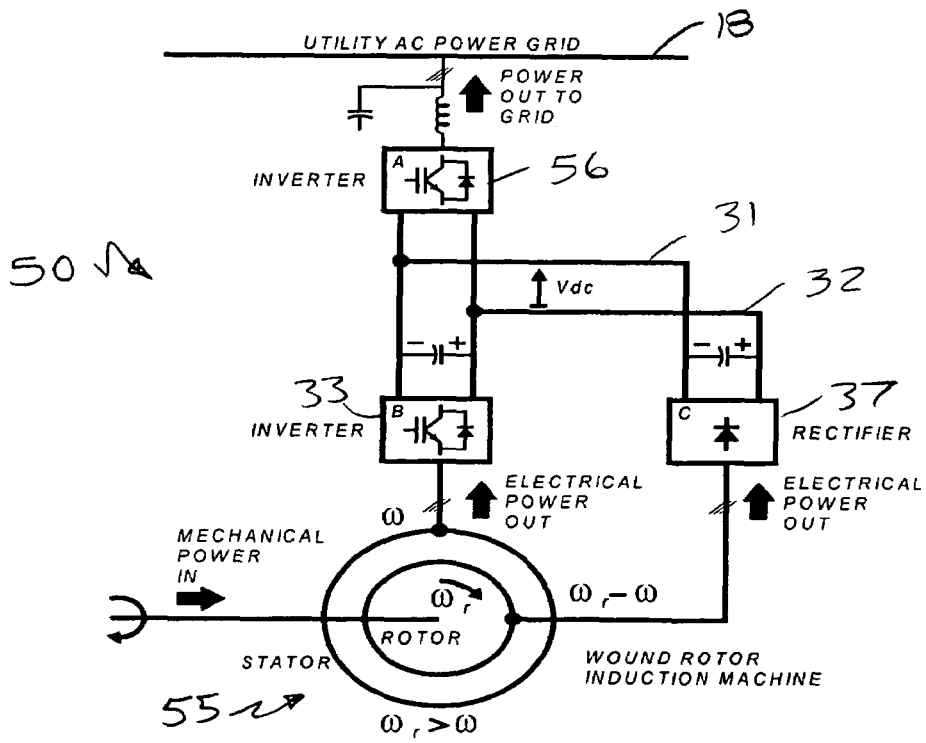
FIG. 5 is a diagram depicting an alternative slip-controlled, wound-rotor induction machine generator that includes an additional power inverter.

Referring to FIG. 5, another alternative implementation of the present invention will be described. The system 50 is a further modification of the system 30 shown in FIG. 3. The modification includes electrically-coupling the outputs of the DC load bus 31 and 32 to an AC utility power grid 18 via a common DC-AC inverter 56. This modification allows generated DC power to be delivered from the DC load bus 31 and 32 to the AC utility power grid 18 at a constant frequency.

Figure 1:
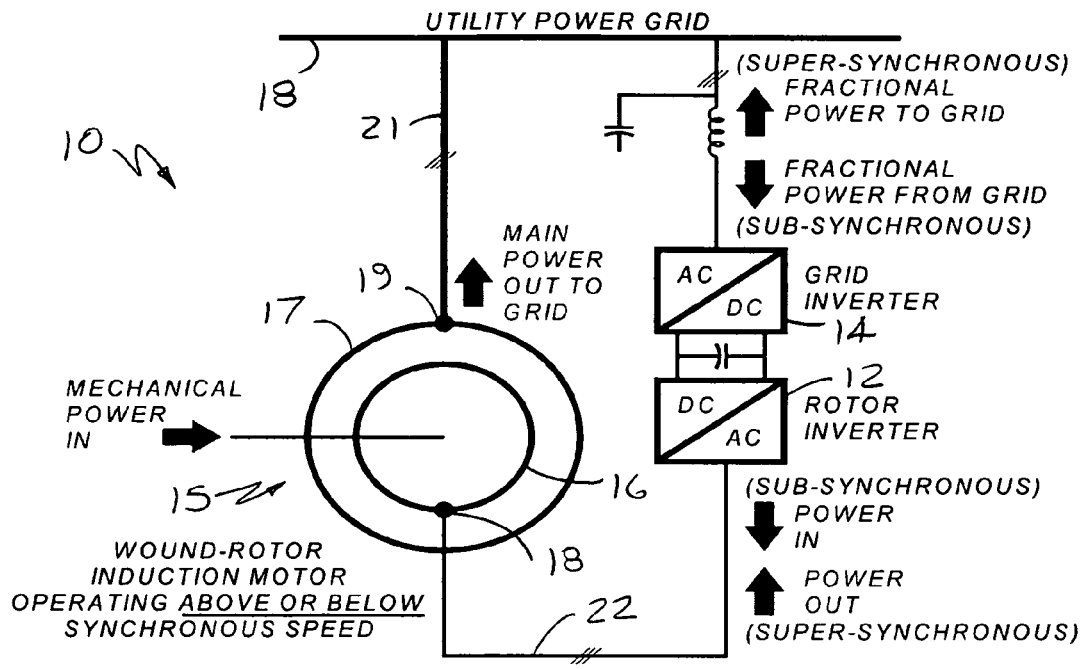
FIG. 1 is a diagram depicting a conventional sub-synchronous or super-synchronous cascade system.
Figure 2:
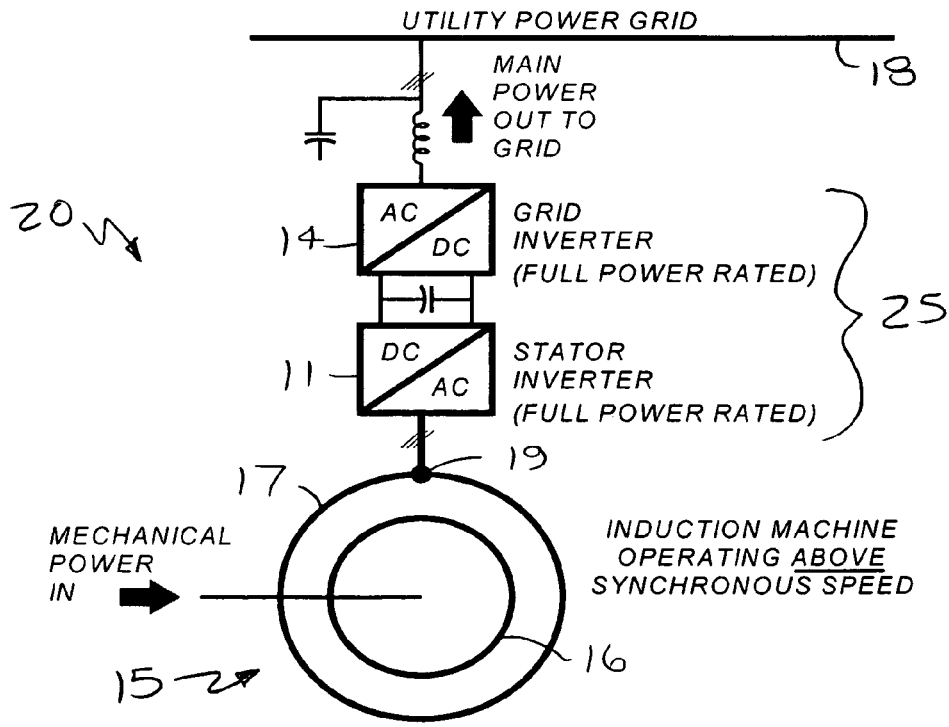
FIG. 2 is a diagram depicting a conventional full-power-rated, double-conversion system that uses field-oriented control.

The implementation provides separation of the WRIMG 55 from the influence of the grid voltage and frequency, using a less costly combination of power inverters than the prior art system shown in FIG. 2. The inverter 56 can provide AC power conditioning and can also serve to regulate the DC bus voltage to a desired constant value independently so that control of the WRIMG 55 can operate with a torque reference as indicated in FIG. 4B.

Figure 6:
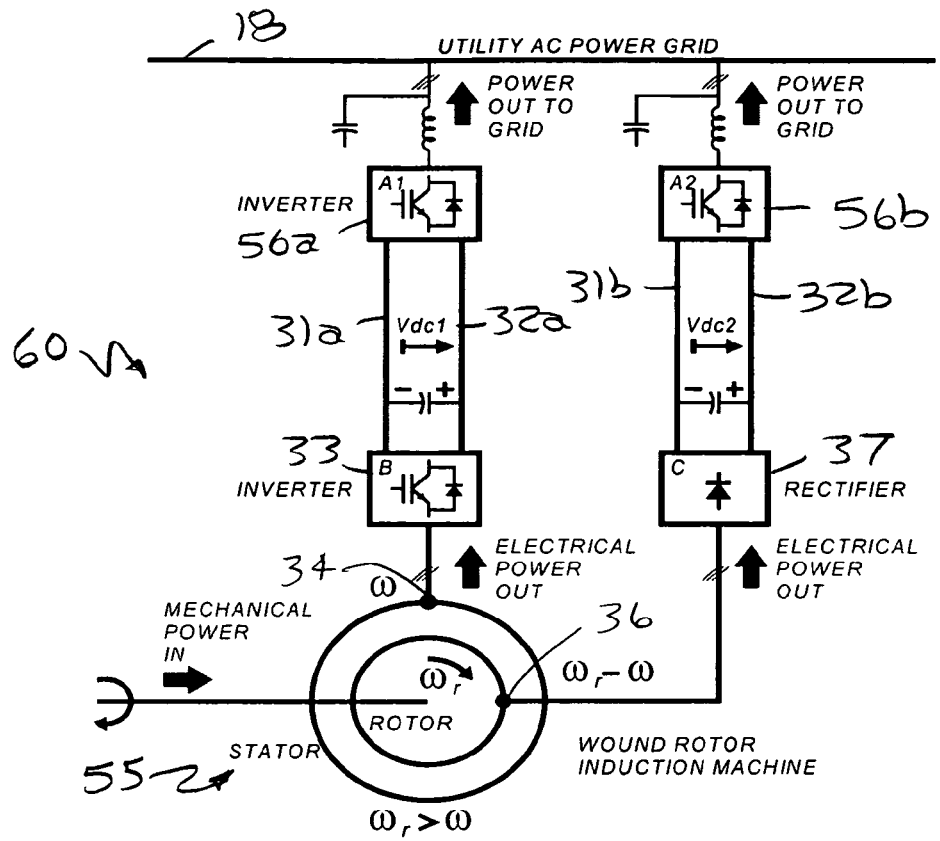
FIG. 6 is a diagram depicting another alternative slip-controlled, wound-rotor induction machine generator having separate load buses from the rotor assembly and the stator assembly to the utility power grid.

Referring to FIG. 6, yet another alternative implementation of the present invention will be described. The system 60 shown in FIG. 6 provides separate DC load buses $V_{dc1}$ and $V_{dc2}$. For example, the stator windings 34 are electrically-coupled to the input of the inverter 33 and the output of the inverter 33 is electrically-coupled to a first DC load bus $V_{dc1}$. The first DC load bus $V_{dc1}$ is electrically-coupled to the input of DC-AC inverter 56a, whose output is electrically-coupled to the utility AC power grid 18. The "slip-rings" 36 are electrically-coupled to the input of the rectifier 37 and the output of the rectifier 37 is electrically-coupled to a second DC load bus $V_{dc2}$. The second DC load bus $V_{dc2}$ is also electrically-coupled to the input of DC-AC inverter 56b, whose output is electrically-coupled to the utility AC power grid 18.

The implementation of FIG. 6 allows different DC load bus voltages on the DC load buses. This allows more operational flexibility in controlling the magnetic flux in the WRIMG 55, and can also allow inverter 33 to operate with lower switching frequency and lower associated power losses.

Figure 7:
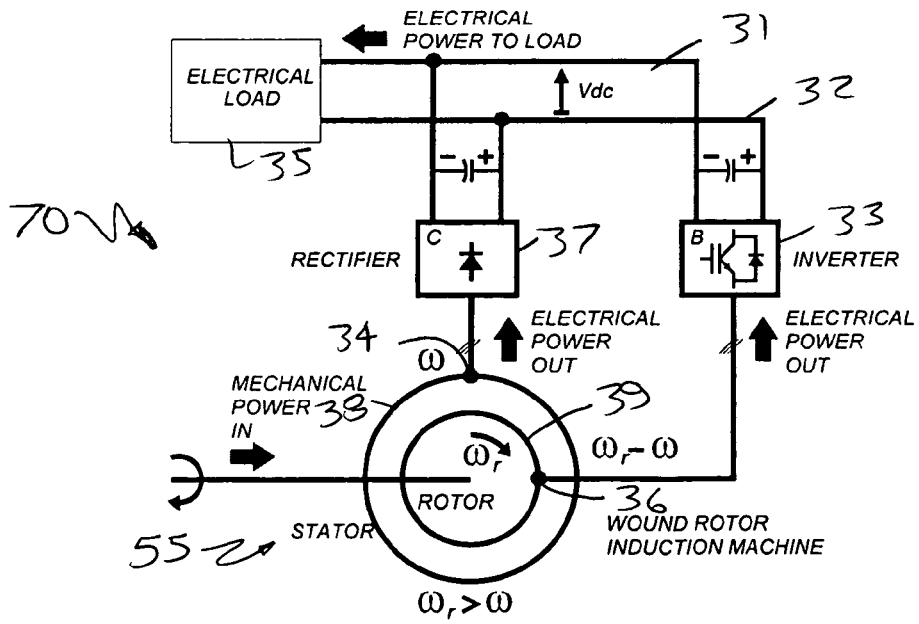
FIG. 7 is a diagram depicting yet another alternative slip-controlled, wound-rotor induction machine generator in which the rectifier bridge is connected to the stator windings and the inverter is connected to the rotor windings.
Figure 10:
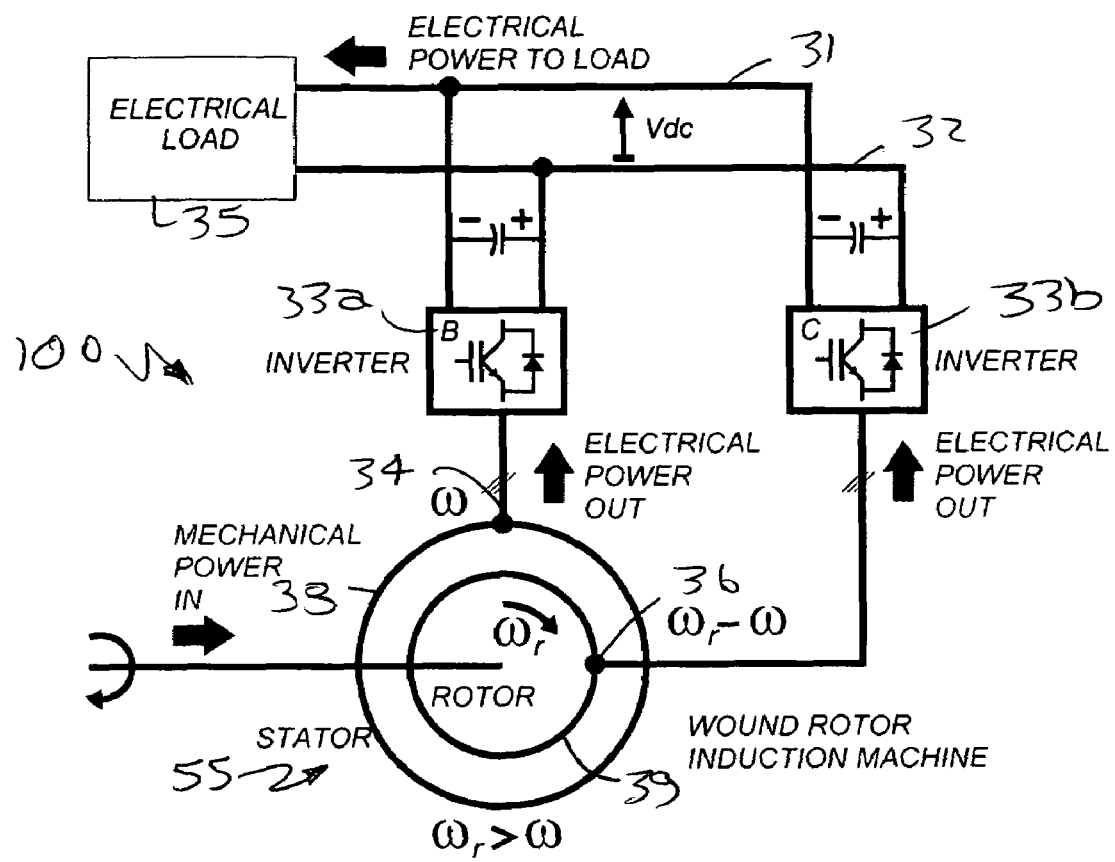
FIG. 10 is a diagram depicting a slip-controlled, wound-rotor induction machine generator in which the rotor assembly and stator assembly are each electrically-coupled via an inverter.

FIGS. 7 and 10 show additional embodiments. The system 70 shown in FIG. 7 is similar to the embodiment previously described in relation to FIG. 3 except that the inverter 33 and the rectifier bridge 37 are reversed. As a result, the stator windings 34 are electrically-coupled to the DC load bus 31 and 32 via the rectifier bridge 37 and the "slip-rings" 36 are electrically-coupled to the DC load bus 31 and 32 through the inverter 33. In short, the rectifier bridge 37 and inverter 33, which are power converters, are transposable.

In the WRIMG 55 the roles of the rotor assembly 39 and the stator assembly 38 are functionally interchangeable. However, since the rotor windings are fed through slip-rings 36 it is advantageous for the WRIMG 55 to be designed so that the rotor current is much less than the stator current. Furthermore a rectifier 70 is far less costly than an inverter 33 of the same current and voltage rating. Therefore, the arrangement of system 70 is advantageous when the stator current is higher than the rotor current, e.g., due to the turns ratio of the WRIMG 55.

The system 100 depicted in FIG. 10 is similar to the system 30 previously described in relation to FIG. 3 except that the rectifier bridge 37 is replaced by a second inverter 33b. More specifically, the input of a first inverter 33a is electrically-coupled to the stator windings 34 and the output is electrically-coupled to the DC load bus 31 and 32 and the input of a second inverter 33b is electrically-coupled to the "slip-rings" 36 of the rotor assembly 39 and the output of the second inverter 33b is electrically-coupled to the DC load bus 31 and 32.

This arrangement provides more flexibility for control of the magnetic flux in the WRIMG 55 than the system 30 shown in FIG. 3, since the DC bus voltage does not determine the terminal voltage of the stator assembly 38 or the rotor assembly 39. The DC bus voltage can be selected independently of the WRIMG 55 voltages. This scheme can be used, e.g., to accommodate an existing WRIMG 55 design where the required DC bus voltage and the existing turns ratio in the WRIMG make it difficult to use the system 30 shown in FIG. 3.

Figure 8:
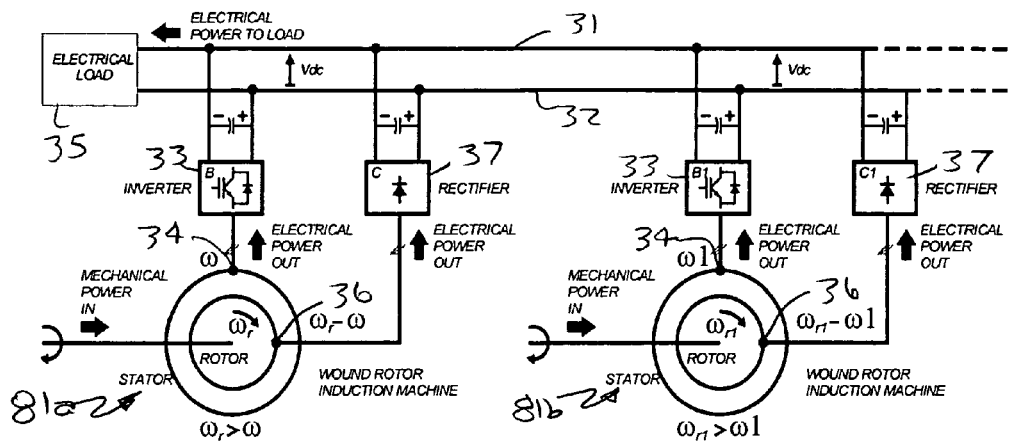
FIG. 8 is a diagram depicting a system using a plurality of slip-controlled, wound-rotor induction machine generators in accordance with the present invention.

The system 80 shown in FIG. 8 includes multiple WRIMGs 81a and 81b that are connected in parallel to the DC load bus 31 and 32. Although each of the WRIMGs 81a and 81b shown in FIG. 8 correspond to the system 30 described in connection with FIG. 3, those of ordinary skill in the art will appreciate that the multiple WRIMGs can be any of the alternate systems shown in FIGS. 3-7 and 10. Furthermore, the multiple WRIMGs 81a and 81b do not all have to be the same type.

Figure 9:
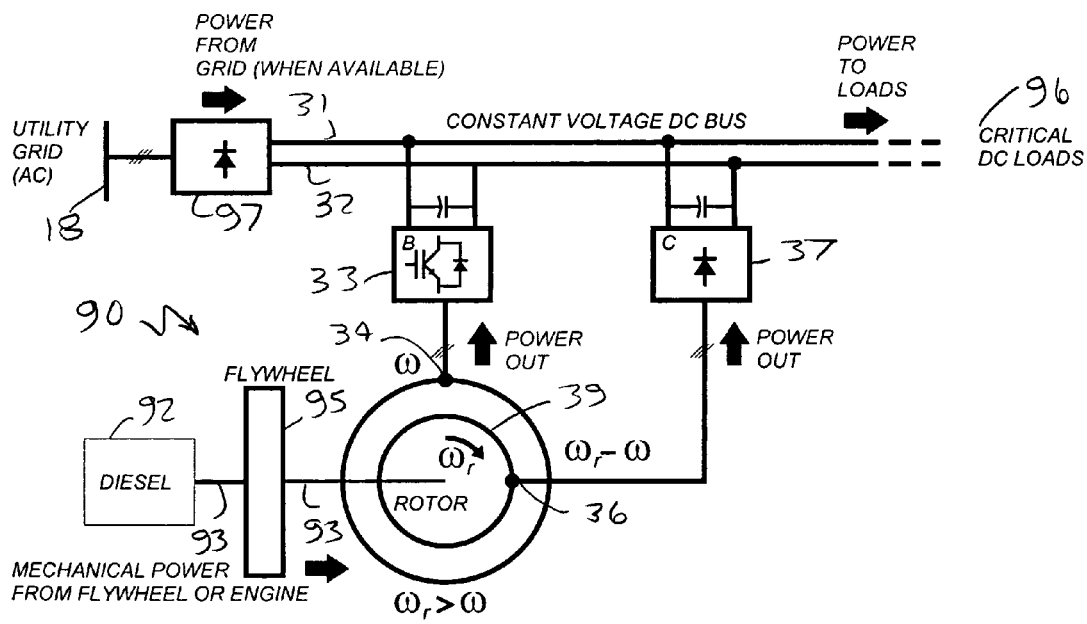
FIG. 9 is a diagram depicting a slip-controlled, wound-rotor induction machine generator in combination with a mechanically-coupled flywheel energy storage system.

Referring to FIG. 9, a system operative in accordance with the present invention to provide uninterruptible DC power to critical DC loads 96 is shown. The system 90 depicted in FIG. 9 is similar to the system 30 previously described in relation to FIG. 3. The system 90, however, further includes a flywheel energy storage assembly 95 and an auxiliary energy supply source 92, such as diesel motor. The system 90, the flywheel energy storage assembly 95, and the auxiliary energy supply source 92 share a common rotor shaft 93.

During "normal" operating conditions, the utility power grid 18 delivers AC power to the input of a rectifier 97. The AC power is rectified to provide DC power to "critical" loads 96 via the DC load bus 31 and 32. In some instances, during "normal" operation, the utility power grid 18 also delivers electrical power to the "slip-rings" 36 of the rotor assembly 39 and/or to the stator windings 34 of the stator assembly 38. In this configuration, the system 90 acts as a motor, converting electrical power from the utility power grid 18 into mechanical energy.

Current flowing through the stator windings 34, causes the rotor windings 36 disposed on the rotor assembly 39 to rotate. The rotating rotor assembly 39 drives a mechanical shaft 93 that is in mechanically-coupled to a flywheel assembly 95 and to the auxiliary energy supply source 92. A clutch mechanism (not shown) can be used to engage and disengage the auxiliary energy supply source 92 from the common shaft 93 as necessary.

When power from the utility power grid 18 is interrupted, the WRIMG 90 instantaneously delivers electrical power to the critical loads 96 before the loads have had a chance to trip or otherwise shut-off. More particularly, kinetic energy stored in the flywheel assembly 95 that is rotating at synchronous or at a super-synchronous speed, can provide variable-speed, mechanical energy sufficient to drive the mechanical shaft 93.

The flywheel assembly 95 provides short-term, mechanical energy to the rotor assembly 39. Once the auxiliary energy supply source 92 is activated and brought on line, the auxiliary energy supply source 92 drives the rotor assembly 39 until the interruption of the utility power grid 18 is corrected.

Figure 11:
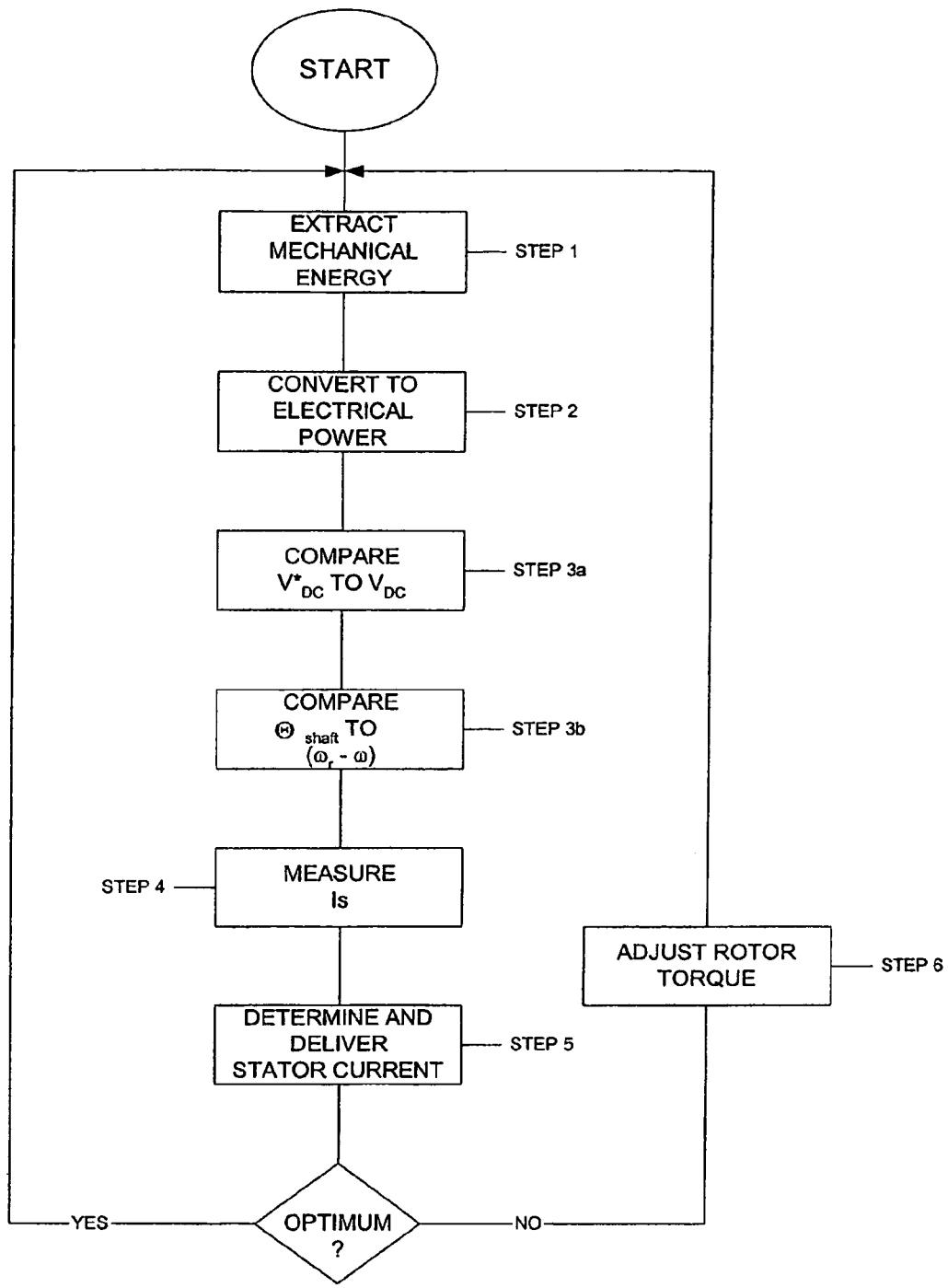
FIG. 11 is a flow diagram of a method for generating a constant-frequency electrical power to a load from a variable-speed, mechanical input.

Having described various systems for delivering constant-frequency electrical power from a variable-speed mechanical energy source to a utility power grid, a method of doing the same using the disclosed systems will now be described. Referring to FIG. 11, a flow chart of a method of converting variable-speed mechanical power into constant-frequency electrical power to a load.

The method includes extracting mechanical energy from a variable-speed, mechanical power source, such as a wind turbine, diesel motor, a gas-powered motor, an hydro-powered turbine, a flywheel energy storage system, and the like (STEP 1). Mechanical energy is provided by driving the rotor assembly of a wound-rotor induction machine generator ("WRIMG") by rotating a shaft to which the rotor assembly is in operational association.

The rotating shaft provides mechanical energy that can then be converted into electrical power (STEP 2), which can be delivered to an electrical load. More specifically, the mechanical energy is converted to electrical power and the electrical power is delivered to an electrical load at a constant frequency (STEP 2).

Electrical power can be provided by inducing a stator current in the stator windings of the stator assembly of the WRIMG. The frequency of the rotor, $(\omega_r-\omega)$, can be maintained at an advantageous value for maximizing total power output at a given rotor speed.

Electrical power from the stator windings, i.e., the stator current, and electrical power from the rotor "slip-rings", i.e., the rotor current, are delivered to a DC load bus, which, in turn, delivers the power to the electrical load (STEP 5). As provided in the above descriptions of the many systems, the stator windings and the "slip rings" can deliver electrical power to the same DC load bus (STEP 5). Alternatively, each of the stator windings and the rotor "slips-rings" can deliver electrical power to separate DC load buses (STEP 5).

Electrical power from the stator windings and from the rotor "slips-rings" are delivered to the DC load bus (STEP 5) via one or more power converters, e.g., an AC-DC inverter and/or a rectifier bridge. As a result, power to the DC load bus and, ultimately, to the electrical load can include electrical power (current) from both the rotor assembly and the stator assembly.

The torque of the WRIMG, which is receiving variable-speed mechanical power input, can be controlled using scalar quantities (STEP 6). For example, the DC load bus voltage, $V_{DC}$, can be measured and compared to a reference DC load voltage, $V^*_{DC}$, (STEP 3a), to provide a reference stator current magnitude, I*. Similarly, the angular position, $\Theta_{shaft}$, of the machine shaft, which is to say the electrical angular position, can be measured and compared with an (integrated) reference rotor assembly frequency, $\omega_r-\omega$ (STEP 3b), to provide a reference stator-current phase angle, $\Theta^*_s$. Further, the output stator-currents from the power converter, $I_s$, i.e., from inverter, can also be measured and the stator-current data provided to a control unit (STEP 4).

The reference stator current phase angle value, $\theta^*_s$, the reference stator current magnitude value, I*, and the measured output stator currents, $I_s$, can then be applied to the controller to determine a current error signal for each phase of the stator which, in turn, after suitable compensation, continuously provides the desired stator voltage references, $v^*_{sa}$, $v^*_{sb}$, and $v^*_{sc}$, to the inverter 33. The control unit can adjust the rotor assembly torque accordingly (STEP 6), to optimize the delivered stator-current so that the DC bus voltage follows the desired value.

To control torque and thereby provide constant-frequency, electrical power from a variable-speed input, the controller uses measurements of the instantaneous magnitude of the stator-currents. More specifically, the controller controls the stator-current to produce a three-phase positive sequence set of currents with frequency, $\omega$, and magnitude, $I_s$. Such a positive sequence set of currents produces a forward-rotating field in the WRIMG, with the desired rotational frequency and magnitude.

For example, the inverter that is electrically-coupled at its input to the stator windings determines the stator excitation frequency as a function of rotor speed. Furthermore, the rotor assembly frequency, $\omega_r-\omega$, can be maintained at a constant or substantially constant, positive value, to ensure that the WRIMG operates with maximum output power capability. As a result, the magnitude of the magnetic flux of the WRIMG is determined by the rotor frequency and the rotor phase voltage.

Thus, the electromagnetic torque of the WRIMG can be controlled by regulating the magnitude of the stator-current. Furthermore, the speed of the WRIMG can be controlled by coordinating the above with the pitch and throttle controls of the mechanical power source. In so doing, the speed of the WRIMG can be optimized.

Although the present invention has been described in conjunction and application with wind turbine generators ("WTGs"), the invention is not to be construed as being limited thereto. In addition to WTGs, the teachings of the present invention can be applied to gas-powered turbines, hydro-powered turbines, flywheel energy storage systems, and other machines and/or power systems that produce current at a variable-speed.

Although preferred embodiments of the invention have been described using specific terms, such descriptions are for illustrative purposes only, and it is to be understood that changes and variations may be made without departing from the spirit or scope of the following claims.

What I claim is:

1. A system for providing constant-frequency, electrical output from a variable-speed mechanical input, the system comprising:

at least one mechanical-to-electrical energy converter, each of said at least one mechanical-to-electrical energy converter including:

a first wound-rotor induction machine having a rotor assembly and a stator assembly, the rotor assembly including a plurality of rotor windings for inducing a stator current in a plurality of stator windings disposed on the stator assembly, the rotor assembly being mechanically-coupled to a shaft driven by a mechanical power delivering device;

a first power converter having an input electrically-coupled to said stator windings and an output electrically-coupled to a first DC load bus;

a second power converter having an input electrically-coupled to said rotor windings and an output electrically-coupled to a second DC load bus; and a controller operative to control at least one of said first and second power converters to regulate the DC load bus voltage on the associated DC load bus, wherein the controller includes a plurality of comparators and said controller is operative, using said plurality of comparators to compare stator-current magnitude data, stator-current phase data, and measured stator-current data to reference data, to control at least one of the first and the second power converters.

2. The system as recited in claim 1, wherein the mechanical power delivering device is selected from the group comprising a diesel generator, a wind turbine, a flywheel energy storage supply device, a gas-powered motor, and a hydro-powered turbine.

3. The system as recited in claim 1, wherein the first power converter and the second power converter are each selected from the group comprising an AC-DC inverter and a rectifier bridge.

4. The system as recited in claim 1, wherein the first DC load bus and the second DC load bus are the same load bus.

5. The system as recited in claim 1, wherein the system further comprises at least one DC-AC inverter having an input electrically-coupled to each of the first and second DC load buses.

6. The system as recited in claim 5, wherein the first and the second DC load buses are the same bus and said at least one DC-AC inverter is a single inverter.

7. The system as recited in claim 5, wherein said at least one DC-AC inverter comprises first and second DC-AC inverters and said first DC-AC inverter having an input electrically-coupled to the first DC load bus and said second DC-AC inverter having an input electrically-coupled to the second DC load bus.

8. The system as recited in claim 1, wherein at least one of the wound-rotor induction machine generators is operative to convert electrical power from the DC load bus into kinetic energy for storage in a flywheel energy storage system.

9. The system as recited in claim 8, wherein, the controller of said at least one mechanical-to-electrical energy converter is operative to cause the flywheel energy storage system to deliver mechanical energy to the rotor assembly of the first wound-rotor induction machine when electrical power from the DC load bus is no longer being converted into kinetic energy.

10. The system as recited in claim 1, wherein the controller is operative to obtain stator-current magnitude data, stator-current phase data, and measured stator-current data and, utilizing said data, to control at least one of the first and the second power converters.

11. The system as recited in claim 1, wherein the controller is operative, using a voltage measured from the first or second DC load bus and a reference DC load bus voltage, to determine stator-current magnitude data to adjust torque levels of the wound-rotor induction machine generator.

12. The system as recited in claim 1, wherein controller is operative to use a torque reference value of the wound-rotor induction machine generator to determine stator-current magnitude reference data to adjust torque levels of the wound-rotor induction machine generator.

* * * * *

UNITED STATES PATENT AND TRADEMARK OFFICE
CERTIFICATE OF CORRECTION

| | | |
|---|---|---|
| PATENT NO. | : 7,554,302 B2 | Page 1 of 1 |
| APPLICATION NO. | : 11/521426 | |
| DATED | : June 30, 2009 | |
| INVENTOR(S) | : Schauder | |

It is certified that error appears in the above-identified patent and that said Letters Patent is hereby corrected as shown below:

Column 12, line 25, claim 12, "wherein controller" should read --wherein the controller--.

Signed and Sealed this

Fifth Day of January, 2010

David J. Kappos
*Director of the United States Patent and Trademark Office*